United States Patent

[11] 3,604,862

[72] Inventor Itsuki Ban
829 Higashi-Oizunimachi Nerima-Ku,
Tokyo-to, Japan
[21] Appl. No. 885,476
[22] Filed Dec. 16, 1969
[45] Patented Sept. 14, 1971
[32] Priority Dec. 18, 1968
[33] Japan
[31] 43/92338

[54] TAPE-CARTRIDGE-POSITIONING APPARATUS
9 Claims, 4 Drawing Figs.

[52] U.S. Cl. 179/100.2 Z, 242/55.19 A, 274/4 C
[51] Int. Cl. G11b 23/04
[50] Field of Search 179/100.2 Z; 274/4 B, 11 B, 4 C, 11 C; 242/55.19 R, 55.19 A, 197, 199, 200; 226/174

[56] References Cited

UNITED STATES PATENTS

| | | | |
|---|---|---|---|
| 3,080,101 | 3/1963 | Kreithen et al. | 242/55.19 A |
| 3,429,519 | 2/1969 | Staar | 242/200 |
| 3,540,738 | 11/1970 | Yamamoto et al. | 179/100.2 Z |

*Primary Examiner*—Bernard Konick
*Assistant Examiner*—Alfred H. Eddleman
*Attorney*—Jacobs & Jacobs

ABSTRACT: A tape cartridge positioning apparatus for an endless magnetic tape cartridge player wherein a reciprocating lever member is slidably supported on a deck in the player housing and normally placed in a first position, a tape cartridge is transversely inserted in the housing through an opening and laid on the deck, the tape cartridge being interposed between a rear arm and a front arm provided on the lever member, the lever member being manually slided from a first position to a second position whereby the rear edge of the cartridge is urged by the rear arm to be moved to the playing position. The reciprocating lever member which is moved to the second position against the bias of a tension spring is retained by a latching means thereby holding the tape cartridge in the playing position. In response to release of retention of the latching means the reciprocating lever member is returned to the first position by the bias of the tension spring at the same time the cartridge is returned to the nonplaying position as the front edge thereof is urged by the front arm.

TAPE-CARTRIDGE-POSITIONING APPARATUS

BACKGROUND OF THE INVENTION

This invention relates to an endless magnetic tape cartridge player, and more particularly to a novel tape-cartridge-positioning apparatus for positioning an endless magnetic tape cartridge insertable in the player in the "play" position. In a well-known endless magnetic tape cartridge player, the tape cartridge to be played is so adapted that it is longitudinally inserted in the player housing through an opening in the housing and is held in the playing position. For this reason, the magnetic head against which the endless magnetic tape within the cartridge abuts is caused to be located in the inmost position in the player housing. This causes much trouble about cleaning of the magnetic head and related parts. Thus, a particular tool or the like is required to clean the magnetic head and related parts. Further, according to those conventional tape cartridge player, the cartridge has been positioned by engagement of an engaging portion (for instance, a notch formed in the sidewall of the cartridge) with an engaging member (for example, a retention member provided on the free end of the leaf spring of which one end is secured to the deck). To this end, the cartridge should be provided with a certain engaging portion in a predetermined position thereof and an associated engaging member suitable for the engaging portion. This results in inconvenience to the user with respect to its convertibility since utilization of cartridge must depends on the engaging portion or the engaging member. In addition, if the engaging member is improperly positioned, not only a relative position between the cartridge and the capstan when the cartridge is held in its playing position but also a relative position between the magnetic head and the record track on the tape are not maintained appropriate to cause lack of stability of the tape running speed resulting wow-flatter or the like and deterioration of reproducing sound. For this reason, high degree of accuracy is required to provide such engaging member in the cartridge.

SUMMARY OF THE INVENTION

It is a primary object of the invention to provide a tape-cartridge-positioning apparatus for an endless magnetic tape cartridge player wherein the tape cartridge is transversely inserted in the player housing through an opening therein and laid on the deck in the housing, a reciprocating lever member slidably supported on the deck is manually slided to move the cartridge in the playing position, the lever member is retained by a latching means to position the cartridge in the playing position.

Another object of the invention is to provide a tape-cartridge-positioning apparatus for an endless magnetic tape cartridge player wherein the reciprocating lever member includes an actuating arm for manually operating the lever member, a rear arm opposed the rear edge of the tape cartridge, and a front arm opposed to the front edge of the cartridge, the cartridge inserted in the player housing is interposed between the rear arm and the front arm, the lever member is manually slided by the actuating arm to allow the rear arm to urge the rear edge of the cartridge thus the cartridge is advanced to its playing position, and the cartridge is still held in the playing position as return thereof is held by the rear arm in such a manner that the lever member is retained by the latching means.

A further object of the invention is to provide a tape-cartridge-positioning apparatus for an endless magnetic tape cartridge player wherein the rear arm is swingably mounted on the reciprocating lever member and is urged by a spring, abutment of a pinch roller in the cartridge in the playing position against a capstan in the player is obtained by the bias of the spring.

Still further object of the invention is to provide a tape-cartridge-positioning apparatus for an endless magnetic tape cartridge player wherein the actuating arm is swingably mounted on the reciprocating lever member, the lever member is swung in the direction reversed to that the lever member is manually slided, the latch means is thereby operated to release retention of the lever member.

Yet another object of the invention is to provide a tape-cartridge-positioning apparatus for an endless magnetic tape cartridge player wherein the latching means automatically releases retention of the reciprocating lever member in relation to detection of an endmark or nonrecorded zone on the endless magnetic tape.

Another object of the invention is to provide a tape-cartridge-positioning apparatus for an endless magnetic tape cartridge player wherein the latching means releases retention of the reciprocating lever member at the same time the reciprocating lever member is returned to its original position by the bias of a tension spring, the tape cartridge is shifted from the playing position to the nonplaying position as the front edge of the cartridge is urged by the front arm.

According to the present invention, any type of cartridges such as those having no engaging portion or differently positioned engaging portion are available to be positioned in the playing position, and a convertible tape-cartridge-positioning apparatus may be provided. Further, in accordance with the invention, cleaning of the magnetic head is facilitated since the tape cartridge is transversely inserted to allow the magnetic head to be positioned adjacent the opening in the player housing.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENTS

Figure 1:
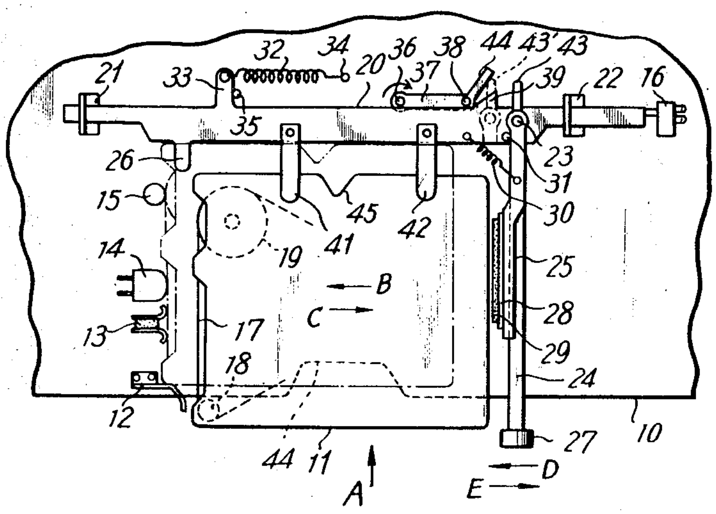
FIG. 1 is a representation schematically showing one embodiment of a tape-cartridge-positioning apparatus according to the invention.

FIG. 1 shows one embodiment of a tape-cartridge-positioning apparatus according to the present invention, wherein numeral 1 is a deck horizontally mounted within a housing (not shown) for an endless magnetic tape cartridge player. An opening (not shown) is normally formed on a front wall of the player housing (not shown) to transversely receive an endless magnetic tape cartridge 11 passing through the opening. The tape cartridge 11 can be laid on the deck 10 upon passing through the opening. Much of the mechanism disposed beneath the deck 10 is omitted since it forms no part of the present invention. However, there shown on the deck 10 are a guide member 12 for the cartridge, an endmark detection or search means 13, a magnetic head 14, a rotational capstan 15, and an electrical switch 16. As will be later described, the capstan 15 is adapted to be rotatably driven by an electrical motor (not shown) which is energized in relation to the closing of the switch 16.

The tape cartridge 11 includes a generally rectangular housing with a centrally disposed reel assembly (not shown) on which an endless magnetic tape 17 is wound and unwound in conventional manner. The endless tape 17 passes over a guide 18 and pinch roller 19. The guide 18 and pinch roller 19 are disposed adjacent the leading edge of the cartridge 11 whereat the cartridge sidewall is cut away or disposed with and the tape 17 is extended from the center of the hub of the reel (not shown) about the guide 18 and thence about the pinch roller 19 back to the outer periphery of a roll formed by the tape wound about the hub.

The tape-cartridge-positioning apparatus according to the present invention includes a reciprocating a lever member 20 slidably supported by guides 21 and 22 fixed to the deck 10. The lever member 20 is provided for moving the cartridge 11 which is inserted in the player housing from the direction of arrow A and is laid on the deck 10 toward the "play" position where the pinch roller 19 in the cartridge abuts against the capstan 15. Pivoted on a pin 23 at one portion of the lever member 20 are two arms 24 and 25, and an arm 26 projects from the other portion thereof. The one end of the arm 24 passes through the opening in the player housing and extends outwardly of the housing. Firmly secured to the arm 24 at the one end thereof is a knob 27 which may be grasped with a finger for moving the lever member 20. The arm 25 includes a laterally extending flange 28 to which a pushing member 29 made of rubber sheet or the like is attached. The arm 25 is biased in the clockwise direction by a spring 30 but inward movement of the arm is limited by a stopper pin 31 on the lever member 20. The stopper pin 31 may control the clockwise rotation of the arm 24 by manual operation.

A comparatively heavy tension spring 32 is interposed between a projecting portion 33 of the lever member 20 and a pin 34 mounted on the deck 10 to normally urge the lever member in the rightward direction. The rightward movement of the lever member 20 due to the tension spring 32 is prevented by abutment of the projecting portion 33 against a stopper pin 35 on the deck 10 whereby the lever member normally takes a first position as shown. The electrical switch 16 is actuated by the lever member at the one end thereof when in the first position but at this moment is opened.

A latch lever 37 is rotatably pivoted to a pin 36 mounted on the deck 10. A hook pin 38 is mounted on the latch lever 37 and engageable with a triangular hook portion 39 formed with the lever member 20 as will be detailed later. The latch lever 37 is biased in the direction of arrow by a spring (not shown) to allow the hook pin 38 to normally abut against the lever member 20 at the one side thereof. The latch lever 37 includes an extension 40 diagonally extending therefrom at the point of the hook pin 38 so as to be away from the lever member 20. Leaf springs 41 and 42 are rigidly mounted on the lever member 20 so as to leave a clearance from the deck 10 to receive the cartridge 11.

It is believed that the mode of operation of the tape-cartridge-positioning apparatus shown in FIG. 1 will be evident from the description hereinafter. In FIG. 1, the cartridge 11 is shown as being partially inserted through the opening in the player housing (not shown) into the housing. In operation, the cartridge 11 is inserted by the finger in the direction of arrow A until the side edge of the cartridge is close to the lever member 20. Next, movement of the arm 24 with the finger in the direction of arrow D slidably moves the lever member 20 by means of the stopper pin 31 against the bias of the tension spring 32 in the same direction of arrow D. With the leftward movement of the lever member 20, the pushing member 29 urges the rear edge of the cartridge 11 to guide the cartridge in the direction of arrow B along the guide member 12 on the deck 20. Accordingly, the capstan 15 abuts against the pinch roller 19 in the cartridge 11. After abutment of the capstan 15 against the pinch roller 19, the lever member 20 is slightly moved to allow the hook pin 38 to engage the hook portion 39. Then, release of the knob 27 from manual depression prevents restoration of the lever member 20 to its original position due to the tension spring 32 by engagement of the hook portion 39 with the hook pin 38. Thus, the lever member 20 is retained at a second position. Where the lever member 20 is retained at the second position, the pushing member 29 urges the rear edge of the cartridge 11 by the bias of the spring 30 to maintain abutment of the pinch roller 19 against the capstan 15 whereby the cartridge 11 is held in the "play" position indicated by the dotted line. The cartridge 11 held in the "-play" position is prevented from transversely moving by both the lever member 20 and the guide member 12 while from upwardly moving by the leaf springs 41, 42 so that a relative position of the cartridge 11 with respect to the endmark detection 13, magnetic head 14 is immovably maintained. Movement of the lever member 20 to deactuate the operation of the electrical switch 16 thereby closing the switch 16. In association with the closing of the switch, the motor (not shown) for rotatably drive the capstan 23 is thus energized. Consequently, the cartridge 11 held in the "play" position is drivingly run by the capstan 15 and the pinch roller 19 for its play with abutting against the magnetic head 14. If the lever member 20 is maintained at the second position, an extension 43 of the arm 24 is in a position indicated at 43' by the dotted line.

If it is desired to suspend the play of the cartridge in the "-play" position, this is accomplished by movement of the knob 27 in the direction of arrow E. Movement of the knob 27 in the direction of arrow E counterclockwise rotates the arm about the pin 23 to allow the extension 43' to urge the extension 40 of the latch lever 37. Thus, the latch lever 37 is counterclockwise rotated against the bias of the spring (not shown) to release the hook pin 38 from the hook portion 39. At the same time, the lever member 20 is rightwardly moved by the bias of the tension spring 32 until the projection portion 33 abuts against the stopper pin 35, and the lever member 20 is returned to its original position. Upon restoration of the lever member 20 to its initial position, the arm 26 urges the front edge of the cartridge 11 to move the latter from the "play" position in the direction of arrow C. As a result, the cartridge 11 is moved back to the "nonplay" position. Simultaneously with restoration of the lever member 20 to the first position, the electrical switch 16 is actuated and opened by the lever member 20, and with which rotation of the capstan 15 is prevented. A notch 44 may be formed with the deck 10 at a portion thereof so as to readily draw from the player housing the cartridge which has been moved to the "nonplay" position.

As described above, since the tape-cartridge-positioning apparatus according to the present invention in FIG. 1 enables the tape cartridge to be transversely inserted into the housing through the opening in the player housing, the magnetic head 14 is allowed to position adjacent the opening to thus facilitate cleaning of the magnetic head. Location of the cartridge 11 in the "play" position does not depend upon a notch 45, for instance, formed with the side wall of the cartridge so that convertibility of the cartridge may be improved.

Figure 2:
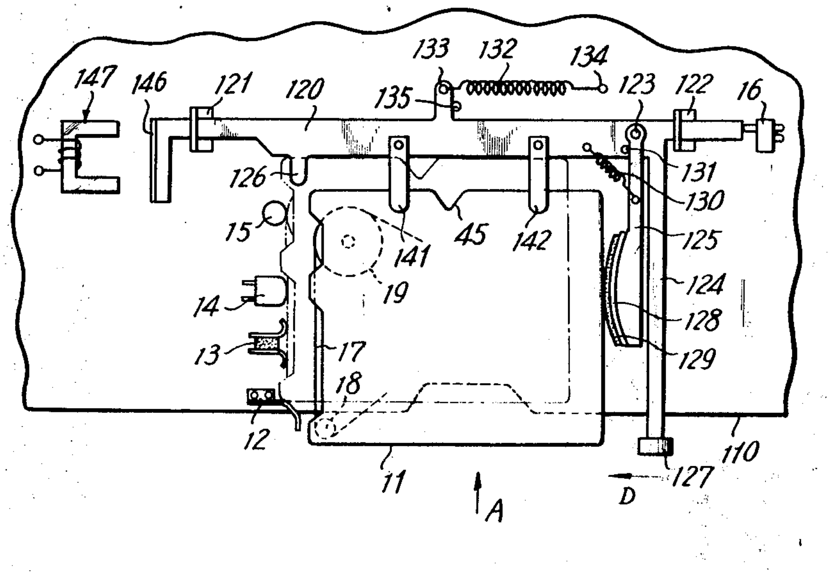
FIG. 2 is also a representation schematically showing another embodiment of the same in FIG. 1.

Referring to FIG. 2, there is shown a modified embodiment of the tape-cartridge-positioning apparatus according to the present invention, wherein similar numerals are used to illustrate like parts in FIG. 1.

A reciprocating lever member 120 which is slidably mounted through guides 121, 122 on a horizontal deck 110 within the player housing (not shown) includes two parallel arms 124 and 126 projecting perpendicular to its slidable movement. The arm 124 has one end passing through the opening in the player housing and extending outwardly of the housing. Rigidly mounted to the one end of the arm 124 is a knob 127 which may be grasped with a finger for moving the lever member 120. An arm 125 is adjacent the arm 124 pivoted to a pin 123 mounted on the lever member 120. The arm 125 is provided with an upwardly bending curved flange 128 to which a pushing member 129 adheres. The arm is biased in the clockwise direction by a spring 130 but inward movement of the arm is limited by a stopper pin 131 on the lever member. A tension spring 132 is interposed between a project portion 133 of the lever member 120 and a pin 134 on the deck 110 to urge the lever member in the rightward direction but movement thereof is limited by abutment of the project portion against a stopper pin 135 on the deck 110. Thus, the lever member 120 is normally held in a first position as shown in FIG. 2. As in the same manner of the apparatus shown in FIG. 1, the cartridge 11 is manually urged in the direction of arrow A until the side edge thereof is close to the lever member and thereafter the knob 127 is moved by a finger in the direction of arrow D to move the lever member 120 in the leftward direction against the bias of the tension spring 132 whereby the cartridge 11 is moved a position indicated by the dotted line, that is, the "play" position since the rear edge of the cartridge is depressed by the pushing member 128. After the cartridge 11 has moved to the "play" position, if the lever member 120 is slightly and manually moved by the knob 127 in the leftward direction, a magnetic piece 146 of mild steel or the like which is mounted on the left hand side of the lever member is attracted to an electromagnet mounted on the deck 110 and thus is retained at a second position against the tension spring 132 even after the finger is free from the knob. Accordingly, the cartridge 11 is thereafter held and played in the "play" position. The details of a control circuit for the electromagnet 147 will be explained by reference to FIGS. 3 and 4.

Figure 3:
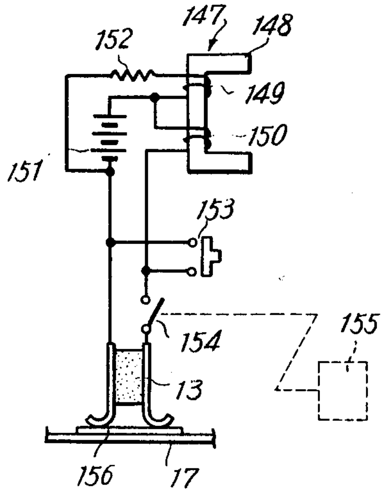
FIGS. 3 and 4 are diagrams illustrating each of the control circuits for the respective electromagnets in FIG. 2.

The electromagnet 147 in FIG. 3 is constituted by an U-shaped core 148 having the first and second coils 149, 150. The first coil 149 is connected to an electrical source 151 through a resistor 152 and is normally supplied with a relatively weak current. The intensity of the magnetic flux generated from the first coil 149 by this weak current is so adapted that it can attract intensely and engage with the magnetic piece 146 on the lever member 120 when the open end of the magnetic circuit of the core 148 is closed by the magnetic piece, but it cannot attract the magnetic piece 146 when the magnetic piece is away from the core. The second coil 150 is in series connected through a normally opened pushbutton switch 153 with the electrical source 151 or is also in series connected through the endmark detector 13 and an electrical switch 153 with the source 151. In order to suspend the play of the cartridge 11 which has been held and played in the "play" position, the pushbutton switch 153 is caused to be manually operated and closed to apply the current from the source 151 to the second coil 150. The direction of current flowing in the second coil 150 is such that it eliminates the magnetic flux generated in the first coil 149, so that when the magnetic piece 146 is attracted by the core 148, the current from the source 151 flows in the second coil 150, the attraction of the magnetic piece 146 is released. Accordingly, relating to manual operation of the pushbutton 153, retention of the lever member 120 by the electromagnet 147 is released to return the lever member from the second position to the first position by the bias of the tension spring 132. In restoration of the lever member 120 to the first position, the front edge of the cartridge 11 is pushed by the arm 126 to move the cartridge 11 from the "play" position to the "nonplay" position.

The electrical switch 154 is built in a variable resistor 155 (indicated by the dotted line) for adjustment of reproducing sound volume, incorporated in a reproducing circuit for the tape cartridge player and is adapted to be closed when the variable resistor 155 is operated to minimize the reproducing sound volume. Although the switch 154 has been closed, the lever member 120 is retained by the electromagnet at the second position whereby the cartridge 11 is thus held in the "-play" position to keep running of the magnetic tape 17 in the cartridge. As the magnetic tape 17 is run, two insulated feeler contacts of the endmark detector 13 are shorted by endmark of conductive piece on the tape to apply the current from the source 151 to the second coil 150. Accordingly, the magnetic flux generated from the first coil 149 is cancelled to allow the electromagnet 147 to release attraction for the magnetic piece 146 on the lever member 120 so that the lever member 120 is automatically returned by the bias of the tension spring 132 to the first position at the same time the cartridge 11 is caused to move from the "play" position to the "nonplay" position. The cartridge 11 held in the "play" position is caused to be shifted to the "nonplay" position in response to detection of the endmark search means 13 upon the endmark 156 on the tape 17 so that with the so-called "ahead-action," a recording starting position of the endless magnetic tape 17 for the cartridge 11 which completes its play is automatically transferred to the next played starting position.

A control circuit shown in FIG. 3 is different from that shown in FIG. 3 in that actuation of the electromagnet 147 is controlled in response to detection of the nonrecorded zone between each of the recorded zones on the tape. In this Figure, similar numerals are used to illustrate like parts having same functions in FIGS. 2 and 3. The electromagnet 147 different from that shown in FIG. 3 is so adapted that only one coil 159 is wound to an U-shaped core 158. The output of the magnetic head 14 is applied through an output terminal 160 to a preamplifier (not shown) in a reproducing circuit (not shown) for the tape cartridge player, and is also applied to a rectifying circuit 161. The details of the rectifying circuit 161 are not illustrated but it is composed of a diode, a capacitor, a resistor to rectify and average the output signal from the magnetic head 14. The output of the rectifying circuit 162 is applied to a detecting circuit 162 constituted by, for instance, a Schmidt circuit. The detecting circuit 162 in case where the output signal from the rectifying circuit 161 exists, does not produce the output signal at the output side thereof but is arranged to generate the output voltage at the output side thereof when the output signal from the rectifying circuit 161 is break off for a predetermined short period of time. That is, when the recorded zone of the tape 17 corresponds to the magnetic head 14, the output voltage of the detecting circuit 162 indicates zero while the predetermined volume of voltage is generated at the output side of the detecting circuit 162 when the nonrecorded zone on the tape 17 corresponds to the magnetic head 14. The output of the detecting circuit 162 is applied through the electrical switch 154 between the base and collector electrodes of PNP transistor 164. The collector electrode of the transistor 164 is connected to a negative pole of an electrical source 165 and the emitter electrode of the transistor is in turn connected through the coil 159 to the positive pole of the source 165. Where the output voltage is not produced from the detecting circuit 162 or the switch 154 is opened, the voltage between the base and the emitter is negative by means of a bias resistor 163. Therefore, the full current is flown from the emitter to the base so that the path from emitter to collector has become short circuited. Thus, the electromagnet 147 is energized by the source 165 to attract the magnetic piece 146 on the lever member 120. Since the output of the detecting circuit 162 is such that its volume is predetermined so as to allow the voltage of the base electrode of the transistor 164 to be zero, if the output voltage is generated from the detecting circuit 162 in closing of the switch 154, the emitter-to-base current of the transistor decays, hence, the path from emitter to collector is open circuited.

Now the cartridge 11 is held in the "play" position and musical performance recorded in the magnetic tape 17 has been reproduced, if the variable resistor 155 is operated to minimize the reproducing sound thereby closing the switch 154. Upon closing the switch 154, the reproducing sound from the cartridge player is reduced while the tape 17 keeps its running. The recorded zone on the tape 17 recording discontinued musical performance passes over the magnetic head 14 and then the nonrecorded zone on the tape 17 corresponds to the magnetic head 14 to substantially erase the output from the magnetic head. Consequently, the output voltage from the rectifying circuit 161 is made zero to allow the detecting circuit 162 to produce the output voltage. As a result, as previously described, the path from the emitter to collector of the transistor 164 is open circuited and the electromagnet 147 is deenergized. It will be understood that in relation to deenergization of the electromagnet 147, retention of the lever member 120 is released to shift the cartridge 11 from the "-play" position to the "nonplay" position.

Figure 4:
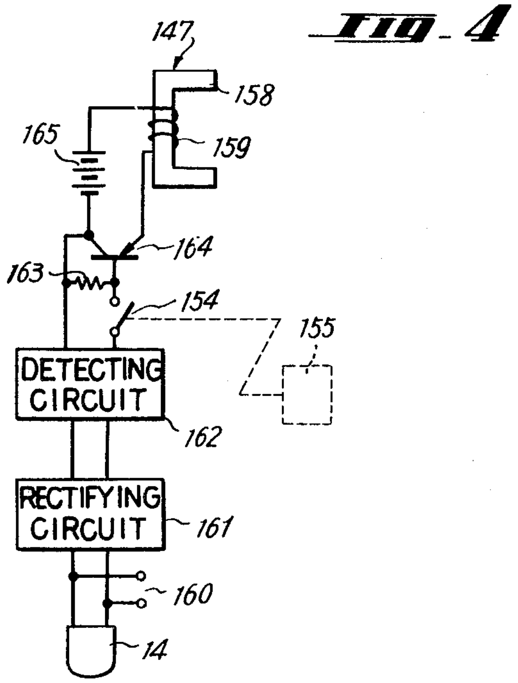

According to the control circuit in FIG. 4, since the cartridge 11 is moved from the "play" position to the " nonplay" position in relation to detection of the nonrecorded zone on the tape 17, reproduction may be initiated from the starting position of the recorded zone on the tape 17 if the cartridge 11 is again played.

The invention and its attendant advantages will be understood from the foregoing description. It is to be understood that change and variations may be made without departing from the spirit and scope of the invention as defined in the appended claims.

What is claimed is:

1. A tape-cartridge-positioning apparatus for an endless magnetic tape cartridge player, the player having a housing provided with tape driving means including a rotary capstan for drivingly transporting an endless magnetic tape in the cartridge in association with a pinch roller within the cartridge and a tape-reproducing circuit including a magnetic head, comprising:

a deck provided in said housing and carrying said capstan and said magnetic head located thereon; an opening formed in said housing, said opening of dimension to allow at least said cartridge to be transversely inserted therethrough, said cartridge being transversely inserted through said opening into said housing and laid on said deck;

a reciprocating lever member slidably provided on said deck in the direction perpendicular to the direction in which said cartridge is inserted, said lever member having a rear arm opposed to the rear edge of said cartridge inserted in said housing and a front arm opposed to the front edge of said cartridge, said cartridge being interposed between said rear arm and said front arm;

a tension spring for urging said reciprocating lever member in one direction;

a stopper member provided on said deck for preventing movement force of said reciprocating lever member due to said tension spring, thereby said reciprocating lever member being normally positioned in a first position where said cartridge inserted in said housing is interposed between said rear arm and said front arm;

a latching means for retaining in a second position said reciprocating lever member which has been manually slided from said first position to said predetermined second position against the bias of said tension spring, and wherein in relation to movement of said reciprocating member to said second position said cartridge being moved to a playing position, as the rear edge thereof is urged by said rear arm, in which said tape is drivingly fed by said capstan and said pinch roller with abutting against said magnetic head, said cartridge being stationed in the playing position by admitting said latching means to retain said reciprocating lever member, in response to release of retension of said reciprocating lever member by virtue of said latching means said lever member being returned to said first position by the bias of said tension spring at the same time said cartridge is moved to the nonplaying position as the front edge thereof is urged by said front arm.

2. A tape-cartridge-positioning apparatus for an endless magnetic tape cartridge player in accordance with claim 1 wherein said reciprocating lever member includes an actuating arm one end of which extends outwardly of said housing, said reciprocating lever member being manually moved by said actuating arm against from said first position to said second position.

3. A tape-cartridge-positioning apparatus for an endless magnetic tape cartridge player in accordance with claim 2 wherein said rear arm is slidably provided on said reciprocating lever member and is given a rotational force by a spring while rotation thereof is limited by a stopper pin mounted on said lever member to a position approximately parallel to said front arm, said rear arm being away from said stopper pin and urgedly abutting against the rear edge of said cartridge by the bias of said spring when said reciprocating lever member is retained in said the second position by said latching means.

4. A tape-cartridge-positioning apparatus for an endless magnetic tape cartridge player in accordance with claim 3 wherein said latching means comprises a latching lever one end of which is journaled on said deck, a hook pin mounted on said latching lever, an engaging portion formed in said reciprocating lever member, said latching lever being normally urged in a situation where said hook pin abuts against the rim edge of said reciprocating lever member, said hook pin being engaged with said engaging portion when said reciprocating lever member is moved to said second position thereby retaining said reciprocating lever member, said actuating arm being swingably mounted on said reciprocating lever member, said actuating arm being prevented from its rotation by said stopper pin common to said rear arm when said reciprocating lever member is moved to said second position, said actuating arm having an extension portion, said actuating arm being manually operated and rotated in the direction reversed to the direction in which said reciprocating lever member is moved to said second position whereby said extension portion urges said latching lever to rotate the latter in a direction in which said hook pin is away from said engaging portion to release engagement of said hook pin with said engaging portion.

5. A tape-cartridge-positioning apparatus for an endless magnetic tape cartridge player in accordance with claim 3 wherein said latching means comprises an electromagnet secured to said deck and a control circuit for said electromagnet, said reciprocating lever member which has been moved to said second position is magnetically attracted and retained.

6. A tape-cartridge-positioning apparatus for an endless magnetic tape cartridge player in accordance with claim 5, wherein said control circuit includes an electrical switch operated and closed when desired and two insulated feeler contacts, said components having an endmark detector located on said deck and shorted by an endmark of a conductive foil mounted on said endless magnetic tape and an electrical source for said electromagnet, said electromagnet being composed of a core and a first and second coils wound to said core, said first coil being normally given the current from said electrical source, said reciprocating lever member being retained by said electromagnet by virtue of the magnetic flux generated in said first coil while said switch, endmark detector, and electrical source are electrically in series with said second coil, upon closing of said switch the current is applied from said source to said second coil when said endmark on said tape comes to presence of said endmark detector to produce the magnetic flux in said second coil, said magnetic flux cancelling the other magnetic flux generated in said first coil, said electromagnet releasing retention of said reciprocating lever member.

7. A tape-cartridge-positioning apparatus for an endless magnetic tape cartridge player in accordance with claim 6, wherein said electrical switch is operated in relation to operation of a variable resistor in said reproducing circuit for adjustment of sound volume, said electrical switch being further closed when said variable resistor is adjusted to minimize sound volume.

8. A tape-cartridge-positioning apparatus for an endless magnetic tape cartridge player in accordance with claim 5, wherein said electromagnet comprises a core, a coil wound to said core, said control circuit includes an electrical switch operated and closed when desired, a detecting means detecting that the nonrecorded zone between the recorded zones on said tape passes over said magnetic head to produce the output signal, and a switching element caused to be turnoff state by the fact that the output signal of said detecting means is applied to said switching element said switch, said switching element being normally maintained in turn on state, said coil being normally furnished with the current from said electrical source through said switching element, by the magnetic flux generated in said coil said electromagnet retains said reciprocating lever member in said second position, said switching element being in turnoff in response to arrival of said nonrecorded zone on said tape at said magnetic head thereby energizing said electromagnet to release retention of said reciprocating lever member.

9. A tape-cartridge-positioning apparatus for an endless magnetic tape cartridge player in accordance with claim 8, wherein said electrical switch is operated in relation to operation of a variable resistor in said reproducing circuit for adjusting sound volume, said electrical switch being closed when adjusted to minimum sound volume of said variable resistor.